United States Patent [19]

Nakayama et al.

[11] Patent Number: 4,613,652

[45] Date of Patent: Sep. 23, 1986

[54] CURABLE RESIN COMPOSITIONS

[75] Inventors: Takeo Nakayama, Ibaraki; Kimiya Fujinami, Takarazuka; Takurou Sakamoto, Kawanishi; Fumihiro Doura, Sakai, all of Japan

[73] Assignee: Takeda Chemical Industries, Inc., Osaka, Japan

[21] Appl. No.: 742,529

[22] Filed: Jun. 7, 1985

[30] Foreign Application Priority Data

Jun. 18, 1984 [JP] Japan ................... 59-125688

[51] Int. Cl.$^4$ ................ C08F 259/04; C08F 259/08
[52] U.S. Cl. ................................ 525/276; 525/293; 525/305; 525/306; 525/307; 525/316; 525/317; 525/322; 525/324
[58] Field of Search ................................ 525/293, 276

[56] References Cited

U.S. PATENT DOCUMENTS 2,759,913  8/1956  Hulse .
4,353,818 10/1982  Maslanka et al. ................ 525/293
4,426,483  1/1984  Maslanka et al. ................ 525/293

OTHER PUBLICATIONS

Japanese published unexamined patent application (Kōkai tokkyo Kōhō) No. 34400/1975 (Laid Open on Apr. 2, 1975).

Primary Examiner—Jacob Ziegler
Attorney, Agent, or Firm—Wenderoth, Lind & Ponack

[57] ABSTRACT

A curable resin composition which comprises (1) a copolymer composed of an aminoalkyl acrylate and/or aminoalkyl methacrylate and an ethylenically unsaturated monomer being formulated with (2) a compound having at least two acryloyl groups in the molecule.

The composition can be cured at low temperatures in the range of ordinary temperature to 120° C., and therefore advantageously used for the formation of coating films in the application fields, such as plastics, wood and concrete, where heat treatment cannot be performed. Also, the composition which exhibits excellent adherence toward various kinds of substrates can be used as adhesives and different kinds of primers, as well. Furthermore, the composition can provide coating films that excel in terms of water resistance, weathering resistance and solvent resistance, and therefore be utilized for overpaints, etc.

9 Claims, No Drawings

CURABLE RESIN COMPOSITIONS

This invention relates to curable resin compositions which excel in low-temperature curing properties.

It has been proposed to provide curable resing composition which are made up of combinations of polymers having at least two (meth)acryloyl groups in the molecule and polyamines having at least two primary or secondary amino groups in the molecule. Since the compositions are of the non-solvent type, nevertheless, the polymer and amino compound to be used as the starting material are both limited to low-molecular-weight compounds, thus providing the resulting cured materials with unsatisfactory physical properties. Besides, an attempt was made to produce linear polymers by reacting piperazine with methylenebisacrylamide in water (U.S. Pat. No. 2,759,913), but this method affords resins, which take the form of linear polymer and therefore exhibit inferior physical properties.

On the other hand, room-temperature drying type acrylic resins are superior in transparency, gloss, weathering resistance, etc., but inferior in solvent resistance, impact resistance, adherence, etc. In order to improve these defects a method which comprises a copolymerization with functional monomers to thereby convert into a reactive type of resin, followed by a crosslinking reaction with a curing agent, such as epoxy and melamine resins, is performed. However, the curing of such a type of resins requires heating at 140° to 180° C. for 20 to 40 minutes. This raises the cost of energy and also restricts the kind of usable substrates to metal articles, etc.

The present inventors, after extensive investigation, found that the combination of copolymers composed of an aminoalkyl acrylate or aminoalkyl methacrylate and an ethylenically unsaturated monomer and compounds having at least two acryloyl groups in the molecule can yield compositions with excellent low-temperature curing properties, and the finding led to completion of the present invention.

Thus, the present invention is concerned with curable resin compositions which comprises (1) a copolymer composed of an aminoalkyl acrylate and/or aminoalkyl methacrylate and an ethylenically unsaturated monomer being formulated with (2) a compound having at least two acryloyl groups.

The copolymer which is usable in the present invention denotes copolymers being composed of an aminoalkyl acrylate and/or aminoalkyl methacrylate represented by the formula

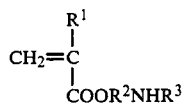

wherein $R^1$ is hydrogen or methyl group; $R^2$ is an alkylene or hydroxyalkylene group of 1 to 6 carbon atoms; $R^3$ is hydrogen or an alkyl group of 1 to 6 carbon atoms
and an ethylenically unsaturated monomer.

Specific examples of the expression "aminoalkyl acrylate" or "aminoalkyl methacrylate" as used herein include acrylates, such as aminomethyl acrylate, aminoethyl acrylate, aminopropyl acrylate, amino-n-butyl acrylate, aminohexyl acrylate, N-methylaminoethyl acrylate, N-tert-butylaminoethyl acrylate and aminohydroxypropyl acrylate; and methacrylates, such as aminomethyl methacrylate, aminoethyl methacrylate, amino-n-butyl acrylate, N-methylaminoethyl methacrylate, N-tert-butylaminoethyl methacrylate and aminohydroxypropyl methacrylate. The content of these aminoalkyl acrylates or aminoalkyl methacrylates in the copolymer is normally in the range of about 1 to 40 weight %, preferably in the range of about 2 to 20 weight %.

On the other hand, examples of the term "ethylenically unsaturated monomer" include alkyl acrylates, such as methyl acrylate, ethyl acrylate, n-butyl acrylate and 2-ethylhexyl acrylate; alkyl methacrylates, such as methyl methacrylate, ethyl methacrylate and n-butyl methacrylate; vinyl esters of fatty acids, such as vinyl acetate, and vinyl propionate; aliphatic monoolefins, such as ethylene, propylene and isobutene; aromatic monoolefins, such as styrene and vinyltoluene; and others, for example, acrylonitrile, vinyl chloride and vinyl fluoride. The copolymers, which are composed mainly of acrylates and methacrylates, among the above monomers, are favorable in terms of weathering resistance and yellowing resistance. One or two kinds of the above monomers may be contained in the copolymer, with the content in the copolymer being normally in the range of about 60 to 99 weight %, preferably in the range of about 80 to 98 weight %.

The copolymer being composed of the aminoalkyl acrylate and/or aminoalkyl methacrylate and ethylenically unsaturated monomer is produced by conducting polymerization in the presence of an aromatic solvent, such as toluene, or alcohol solvent, such as isopropanol, or ester solvent, such as ethyl acetate, in accordance with the conventional method, employing a radical polymerization initator, such as those based on azo or peroxide compoungs, solely or in combination with a chain transfer agent, such as mercaptans, if necessary.

The above-described copolymer contains at least two amine groups in the molecule, with its weight average molecule weight suitably being in the range of about 1,000 to 1,000,000, preferably in the range of about 5,000 to 500,000. The copolymer is used as such, but may be ketiminized with aliphatic or cyclic ketones, such as methyl ethyl ketone, methyl isobutyl ketone and cyclohexanone. The ketiminized product, when used in combination with the below-described compound having at least two acryloyl groups in the molecule, can provide stable one-component compositions.

Examples of the compound (2) having at least two acryloyl groups in the molecule, which is useful for crosslinking of the above-described copolymer (1), include diacrylates, such as ethylene glycol diacrylate, propylene glycol diacrylate, tetramethylene glycol diacrylate, hexamethylene glycol diacrylate and bisacryloyloxyethylhydroxyethylisocyanurate; triacrylates, such as glycerine triacrylate, trimethylolpropane triacrylate, pentaarythritol triacrylate and trisacryloyloxyethylisocyanurate, tetraacrylates, such as pentaerythritol tetracrylate, urethane acrylates made up of aliphatic or alicyclic diisocyanates or polyisocyanates formed by the reactions of excess of these diisocyanates with low-molecular-weight active compounds, such as trimethylolpropane, triethanolamine and water, and acrylates, such as hydroxyethyl acrylate and hydroxypropyl acrylate, acrylamides, such as methylenebisacrylamide and bisacrylamidomethyl ether;

Reaction products of compounds having an epoxy group with acrylic acid, such as acrylic acid adduct of ethylene glycol diglycidyl ether, acrylic acid adduct of glycerine diglycidyl ether, acrylic acid adduct of bisphenol A diglycidyl ether and acrylic acid adducts of O-cresol novolac polyglycidyl ethers; and Polyester acrylates, such as diacrylate of a polyester diol of succinic acid and propylene glycol, diacrylate of a polyester diol of phthalic acid and diethylene glycol, diacrylate of a polyester diol of tetrahydrophthalic acid and diethylene glycol and polyacrylates of polyester polyols of adipic acid and trimethylolpropane and propylene glycol.

The maximum molecular weight per acryloyl group of the above-described compounds (2) to be used for the crosslinking is in the range of 1,000.

Among the above-described, those having the molecular weight of 80 to 300 are preferable. These compounds can be used either solely or as a mixture of not less than two kinds.

The proportion of the copolymer (1) and the compound (2) to be used is preferably: [a number of hydrogen atoms in the amino group of (1)]/[a number of acryloyl groups in (2)]=about 0.3 to 5, particularly preferably in the range of about 0.5 to 2.

The curable resin composition of the present invention is obtained by the above procedure can be used as a solution in organic solvents, such as ethyl acetate, isopropyl alcohol, methyl ethyl ketone, toluene and xylene, and also as an emulsion formed by dispersing in water. If necessary, other resins, such as epoxy resins, plasticisers, fillers, etc. can be added.

The curable resin composition of the present invention can be cured at low temperatures in the range of ordinary temperature to 120° C., and therefore are advantageously used for the formation of coating films in the application fields, such as plastics, wood and concrete, where heat treatment cannot be performed. Naturally, it can be utilized for the formation of coating films in the application fields, such as metal materials, where high temperature treatment can be effected. Also, the composition of the present invention which exhibits excellent adherence toward various kinds of substrates can be used as adhesives and different kinds of primers, as well. Furthermore, the composition of the present invention can provide coating films that excel in terms of water resistance, weathering resistance and solvent resistance, and therefore can be utilized for overpaints, etc.

The reference example and examples are described below to illustrate the present invention more specifically. The terms "part" and "%" as shown in the reference example and examples denote "part by weight" and "weight %".

REFERENCE EXAMPLE

Resin (A)

A 30% toluene solution of a copolymer with a weight average molecular weight of 70,000 having a copolymerization composition of 86 parts of methyl methacrylate and 14 parts of aminoethyl methacrylate.

Resin (B)

A 30% toluene solution of a copolymer with a weight average molecular weight of 72,000 having a copolymerization composition of 70 parts of methyl methacrylate, 15 parts of butyl acrylate and 15 parts of aminoethyl methacrylate.

Resin (C)

A 40% toluene solution of a copolymer with a weight average molecular weight of 60,000 having a copolymerization composition of 77 parts of methyl methacrylate, 9 parts of butyl acrylate and 14 parts of aminoethyl methacrylate.

Resin (D)

A 35% toluene solution of a copolymer with a weight average molecular weight of 30,000 having a copolymerization composition of 40 parts of methyl methacrylate, 40 parts of styrene, 10 parts of butyl acrylate and 10 parts of aminoethyl methacrylate.

Resin (E)

A 30% toluene solution of a copolymer with a weight average molecular weight of 56,000 having a copolymerization composition of 77 parts of methyl methacrylate, 10 parts of butyl acrylate and 13 parts of aminomethyl acrylate.

Resin (F)

A resin solution prepared by dissolving the copolymer as described under Resin (A) in methyl isobutyl ketone to conduct ketiminization, followed by adjustment to 30% of a resin content.

Acrylic polyol (1)

A 40% toluene solution (an OH equivalent of 1450) of an acrylic copolymer with a weight average molecular weight of 70,000 having a copolymerization composition of 30 parts of methyl methacrylate, 20 parts of styrene, 30 parts of butyl acrylate and 20 parts of hydroxyethyl acrylate.

Acrylic polyol (2)

Acrydic A-801 (produced by Dai-Nippon Ink & Chemicals Inc.; with an OH equivalent of 1120).

Blocked isocyanate

A 60% ethyl acetate/methyl isobutyl ketone (1/1) solution (an NCO equivalent of 445) of a blocked isocyanate prepared by blocking a polyisocyanate formed by the reaction between 1 mole of trimethylolpropane and 3 moles of hexamethylene diisocyanate with methyl ethyl ketoxime.

Polyisocyanate

A biurettized product of hexamethylene diisocyanate. (Takenate D-165N produced by Takeda Chemical Industries, Ltd.; with an equivalent of 180).

EXAMPLE 1

A 56 parts portion (as a solid content) of Resin (A), along with 40 parts of titanium dioxide, was allowed to undergo dispersion with a ball mill, and 4 parts of trimethylolpropane triacrylate was added to the dispersion. The mixture was spray-coated onto a mild steel plate to a thickness of baked coating film of 40 to 50 μm, followed by baking at 80° C. for 30 min. or at 120° C. for 5 min. The resulting coating film showed a pencil hardness of 3H, a 60° specular gloss of 95 and excellent solvent resistance. The coating film exhibited a gloss retention of 85% and a color of 3.0 after irradiation in an accelerated weathering test machine (manufactured by Q-Panel Co. of the U.S.A.) for 1000 hours.

EXAMPLE 2

The procedure of Example 1 was repeatedly carried out, except that Resin (B) and pentaerythritol triacrylate were used in place of Resin (A) and trimethylolpropane triacrylate, respectively. The coating film after being baked at 120° C. for 20 minutes exhibited a pencil hardness of H and excellent solvent resistance.

EXAMPLE 3

In accordance with the procedure of Example 1 except the Resin (C) was used in place of Resin (A), a paint was prepared. The coating film after being baked at 120° C. for 15 minutes showed a pencil hardness of 2H and excellent solvent resistance.

EXAMPLE 4

By mixing 57 parts (as a solid content) of Resin (D), 40 parts of titanium dioxide and 3 parts of trimethylolpropane triacrylate, a paint was prepared. The coating film after being baked at 120° C. for 15 minutes showed a pencil hardness of H and excellent solvent resistance.

EXAMPLE 5

By employing Resin (E) in place of Resin (A) in Example 1, a paint was prepared. The coating film after being baked at 120° C. for 10 minutes showed a pencil hardness of 2H and excellent solvent resistance.

EXAMPLE 6

By mixing 93 parts of Resin (F) with 7 parts of trimethylolpropane triacrylate, a one-component resin was prepared. The resin underwent no change at 40° C. over the period of not less than 2 months, and remained usable. The coating film after being baked at 80° C. for 30 minutes showed a pencil hardness of 2H and excellent solvent resistance.

COMPARATIVE EXAMPLE 1

By mixing 14.5 parts of Acrylic polyol (1) with 4.5 parts of Blocked isocyanate, a one-component urethane resin was prepared. The resulting coating film after being baked at 140° C. for 20 minutes showed only unsatisfactory solvent resistance.

EXAMPLE 7

By combining Resins (A) and (C) respectively with trimethylolpropane triacrylate in accordance with the procedure of Example 1, the compositions were prepared, and spray-coated onto mild steel plates to a thickness of baked coating films of 40 to 50 μm, followed by curing at 120° C., 80° C., and ambient temperature. The typical properties of the resulting coating films were measured, with the results being shown in Table 1.

As Comparative Example 2, there is illustrated the case of the so-called two-component urethane paint based on Acrylic polyol (2) and a polyisocyanate.

TABLE 1

| | Resins | | | | | | Comparative Example 2 |
|---|---|---|---|---|---|---|---|
| | (A) | | | (C) | | | |
| Curing Conditions | 120° C. 20 min. | 80° C. 30 min. | RT 6 days | 120° C. 20 min. | 80° C. 30 min. | RT 6 days | 40° C. 16 hours |
| Water resistance (40° C.) 3 days | ⊙ | ⊙ | — | ⊙ | ⊙ | — | ○ |
| 7 days | ⊙ | ⊙ | — | ⊙ | ⊙ | — | ○ |
| Pencil hardness | 3H | 2H | 3H | 2H | H | 3H | HB to F |
| Ethyl acetate spot test | ⊙ | ⊙ | ⊙ | ⊙ | ⊙ | ⊙ | △ |
| Petrol resistance 5 ml/3 min. | >2H | 2H | 2H | >2H | 2H | 2H | HB to H |
| Felt pen Black | ⊙ | ⊙ | ⊙ | ⊙ | ⊙ | ⊙ | △ to ○ |
| Felt pen Red | ⊙ | ⊙ | ⊙ | ⊙ | ⊙ | ⊙ | △ to ○ |

(Note)
⊙ A
○ B
△ C

What is claimed is:

1. A curable resin composition which comprises (1) a copolymer composed of (a) at least one member selected from the group consisting of an aminoalkyl acrylate and an aminoalkyl methacrylate and (b) at least one member selected from the group consisting of an, acrylate, a alkyl methacrylate, a vinyl ester of fatty acid, an aliphatic monoolefin, an aromatic monoolefin, acrylonitrile, vinyl chloride and vinyl fluoride being mixed with (2) a compound having at least two acryloyl groups in the molecule.

2. The curable resin composition as claimed in claim 1, wherein the copolymer is one having a weight average molecular weight of about 1,000 to 1,000,000.

3. The curable resin composition as claimed in claim 1, wherein said at least one member in the copolymer is one represented by the formula:

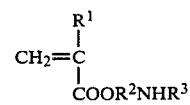

wherein
R$^1$ is hydrogen or methyl group,
R$^2$ is an alkylene or hydroxyalkylene group of 1 to 6 carbon atoms and
R$^3$ is hydrogen or an alkyl group of 1 to 6 carbon atoms.

4. The curable resin composition as claimed in claim 1, wherein the content of the aminoalkyl acrylate, aminoalkyl methacrylate or mixtures thereof in the copolymer is in the range of about 1 to 40 weight %.

5. The curable resin composition as claimed in claim 1, wherein (b) is the acrylate, the methacrylate or mixtures thereof.

6. The curable resin composition as claimed in claim 1, wherein the compound (2) is one having a molecular weight of 80 to 300.

7. The curable resin composition as claimed in claim 1, wherein the proportion of the copolymer (1) to the compound (2) is:

the number of hydrogen atoms in the amino group of (1)/the number of acryloyl groups in (2)=about 0.3 to 5.

8. The curable resin composition as claimed in claim 1, wherein the compound (2) is trimethylolpropane triacrylate.

9. The curable resin composition as claimed in claim 1, wherein the compound (2) is pentaerythritol triacrylate.

* * * * *